United States Patent
Yamauchi et al.

(10) Patent No.: US 6,497,751 B2
(45) Date of Patent: Dec. 24, 2002

(54) WATER-BASED PAINT RECYCLING METHOD

(75) Inventors: Masahiro Yamauchi, Osaka-fu (JP); Kageki Fujimoto, Kanagawa-ken (JP)

(73) Assignee: Nippon Paint Co., Ltd., Osaka-fu (JP)

( * ) Notice: Subject to any disclaimer, the term of this patent is extended or adjusted under 35 U.S.C. 154(b) by 17 days.

(21) Appl. No.: 09/741,427

(22) Filed: Dec. 21, 2000

(65) Prior Publication Data

US 2001/0006021 A1 Jul. 5, 2001

(30) Foreign Application Priority Data

Dec. 21, 1999 (JP) .......................................... 11-363029

(51) Int. Cl.⁷ .............................................. B01D 47/06
(52) U.S. Cl. ..................... 95/189; 55/463; 55/DIG. 46; 95/205; 96/234; 96/240; 118/326
(58) Field of Search .......................... 96/271, 272, 273, 96/267, 234, 240, 322; 55/466, 423, 385.1, 385.2, DIG. 46; 118/326, 602, 603; 95/189, 205

(56) References Cited

U.S. PATENT DOCUMENTS

| | | | |
|---|---|---|---|
| RE27,058 E | * | 2/1971 | Wiggins |
| 3,905,785 A | * | 9/1975 | Fabre |
| 4,096,066 A | * | 6/1978 | Kearney |
| 4,102,303 A | * | 7/1978 | Cordier et al. |
| 4,265,642 A | * | 5/1981 | Mir et al. |
| 4,607,592 A | | 8/1986 | Richter |
| 4,684,378 A | * | 8/1987 | Bratten |
| 4,696,254 A | * | 9/1987 | Spindler |
| 4,735,637 A | * | 4/1988 | Patte |
| 4,783,257 A | * | 11/1988 | Morioka et al. |
| 4,818,388 A | * | 4/1989 | Morioka et al. |
| 5,019,138 A | * | 5/1991 | Farrah et al. |
| 5,078,084 A | * | 1/1992 | Shutic et al. |
| 5,292,547 A | * | 3/1994 | Schlumpf et al. |
| 5,334,255 A | | 8/1994 | James et al. |
| 5,453,301 A | | 9/1995 | Saatweber et al. |
| 5,545,239 A | * | 8/1996 | Cordier |
| 2002/0000191 A1 | * | 1/2002 | Yamane |

FOREIGN PATENT DOCUMENTS

| | | |
|---|---|---|
| EP | 0 624 631 | 11/1994 |
| JP | 5-214267 | 8/1993 |
| JP | 6-7718 | 1/1994 |
| JP | 6-320103 | 11/1994 |
| JP | 11-47653 | 2/1999 |

* cited by examiner

Primary Examiner—Duane S. Smith
(74) Attorney, Agent, or Firm—Wenderoth, Lind & Ponack, L.L.P.

(57) ABSTRACT

It is an object of the present invention to provide a water-based paint recycling method with which there is no need to set up the water-based paint application booth close to the condensing separator, which affords greater freedom in installation. The present invention is a water-based paint recycling method in which, in a water-based paint application booth in the bottom of which booth water is pooled, the paint mist produced when a-water-based paint is applied is trapped by this booth water, the booth water containing this trapped paint mist is treated by the condensing separator, and the resulting concentrate and filtrate are reused, wherein this water-based paint recycling method is characterized in that the water-based paint application booth and the condensing separator are independent, not being connected by piping.

9 Claims, 2 Drawing Sheets

WATER-BASED PAINT RECYCLING METHOD

BACKGROUND OF THE INVENTION

1. Field of the Invention

The present invention relates to a water-based paint recycling method in which the paint mist generated during painting in a water-based paint application booth is recovered and reused, and more particularly relates to a water-based paint recycling method in which there is no need for the water-based paint application booth to be set up in proximity to the condensing separator.

2. Description of the Related Art

In an effort to conserve resources and energy, and to protect the environment, there have been attempts in recent years at recovering and reusing the paint mist that is generated when a water-based paint is sprayed onto the object being painted but does not adhere to this object.

For instance, Japanese Laid-Open Patent Application H5-214267 discloses a method for condensing a water-based paint in which the water-based paint is trapped in water to obtain a diluted paint, which is then filtered to remove the water and condense [the paint]. Japanese Laid-Open Patent Application H6-7718 discloses that recovered washing water with a concentration of 1 to 1.5 wt % is condensed by being sent through a two-stage ultrafiltration apparatus, and is then reused as a spray paint. Japanese Laid-open Patent Application H6-320103 discloses a method for reusing the liquid separated from recovered paint, in which a water-based paint is trapped in washing water to obtain a diluted paint, which is then separated into paint and water, allowing the paint to be recovered and the separated liquid to be reused as washing water. Japanese Laid-Open Patent Application H11-47653, meanwhile, discloses a shower coating system in which a water-based paint and washing liquid recovered from a shower coating booth are guided into an ultrafiltration circulation channel, the filtrate is taken off and collected in a filtrate tank, and the collected filtrate and any supplemental filtrate components added as necessary are used as a washing liquid, while condensate is further guided to the ultrafiltration circulation channel and the water-based paint concentration is brought to the application concentration, and the recovered water-based paint and any fresh water-based paint added as necessary are supplied to the shower coating process, with this process carried out continuously. All of the above publications disclose that the painting booth is connected by piping to the condensing separator where filtration, concentration, and separation are carried out, and that the same number of condensing separators are provided as painting booths.

However, whether the equipment is existing or new, providing a plurality of condensing separators in the vicinity of the painting booths is problematic in terms of both space and cost.

Also, connecting these components is substantially accomplished by laying out piping on site, and this piping is of considerable length and requires maintenance.

SUMMARY OF THE INVENTION

It is therefore an object of the present invention to provide a method for recycling a water-based paint, with which there is no need to install the condensing separator close to the water-based paint application booth, thereby affording greater freedom in layout.

The present invention is a water-based paint recycling method in which the paint mist that is generated when a water-based paint is applied in a water-based paint application booth in the bottom of which booth water is pooled is trapped by the booth water, after which the booth water containing the trapped paint mist is treated with a condensing separator to form condensate and filtrate which are reused, wherein the water-based paint application booth and the condensing separator are independent, not being connected by piping. Here, it is preferable if a plurality of water-based paint application booths are set up, and if the condensing separators are set up in a number smaller than the number of water-based paint application booths.

Here, in more specific terms, upon completion of the painting, the booth water pooled at the bottom of the water-based paint application booth is transferred to a transport tank, after which the booth water in the transport tank is transferred to the condensing separator. Further, the bottom of the water-based paint application booth is filled with fresh water after the booth water has been transferred from the bottom of the water-based paint application booth to the transport tank. It is also preferable if the inside of the transport tank is agitated.

DESCRIPTION OF THE PREFERRED EMBODIMENTS

Figure 1:
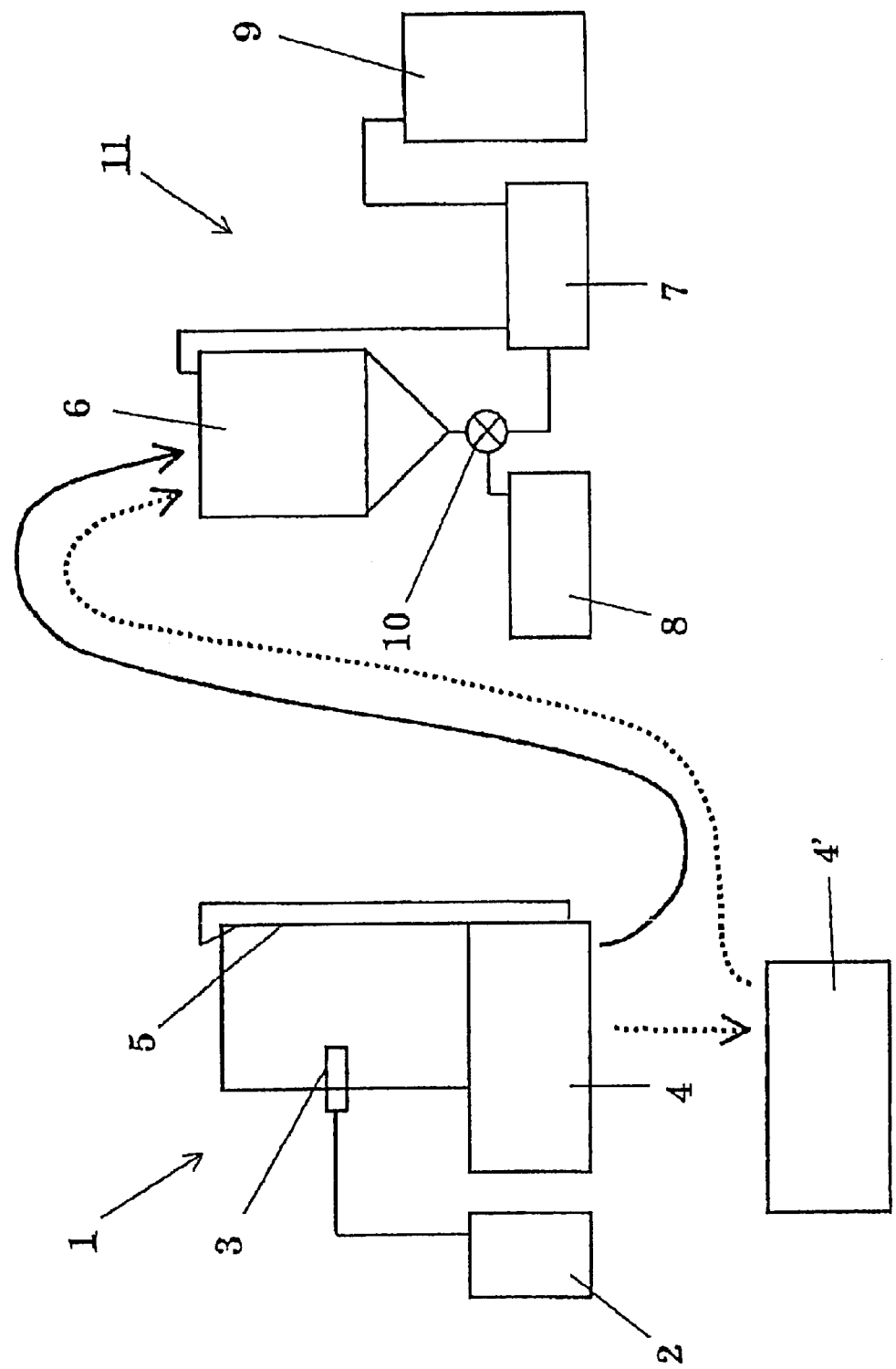
FIG. 1 is a diagram of one example of the water-based paint recycling method of the present invention.

The water-based paint recycling method of the present invention is water-based paint recycling method in which the paint mist that is generated when a water-based paint is applied in a water-based paint application booth in the bottom of which booth water is pooled is trapped by the booth water, after which the booth water in which the paint mist has been trapped is treated with a condensing separator, and the condensate and filtrate thus obtained are reused, wherein the water-based paint application booth and the condensing separator are independent, not being connected by piping.

Booth water is pooled at the bottom of the water-based paint application booth in the water-based paint recycling method of the present invention. There are no particular restrictions on the above-mentioned booth water, but examples include the liquid used to dilute the water-based paint being used, industrial water, city water, and the filtrate obtained by the water-based paint recycling method of the present invention. From the standpoint of the effect of the present invention, however, the liquid used to dilute the water-based paint being used, and the filtrate obtained by the water-based paint recycling method of the present invention are preferred.

The above-mentioned liquid used to dilute the water-based paint can be any one that is well known to persons skilled in the art, as dictated by the water-based paint being used. Examples include deionized water alone and deionized water containing a water-soluble organic solvent. There are no particular restrictions on the above-mentioned water-based paint, which can be any one that is well known to persons skilled in the art, but examples include thermosetting types, normal temperature curing types, and normal temperature drying types.

From the standpoint of preventing the fouling of the walls inside the booth, it is preferable if part of the above-mentioned booth water runs down along the inner walls of the above-mentioned water-based paint application booth, forming a so-called "water curtain." This water curtain preferably flows into the booth water pooled at the bottom of the water-based paint application booth.

The water-based paint application booth in the water-based paint recycling method of the present invention is also equipped with a paint coater for applying the water-based paint held in the paint tank. This paint tank serves to hold the water-based paint that is used for painting. This paint tank may be installed on the inside or outside of the water-based paint application booth. It is preferable here for the paint tank to be equipped with a pump or the like for sending the water-based paint to the applicator in the booth. There are no particular restrictions on the applicator, but a spray applicator is one example. More specific examples include air sprayers, airless sprayers, and electrostatic sprayers.

The condensing separator in the water-based paint recycling method of the present invention serves to separate the booth water in which the generated paint mist has been trapped into concentrate and filtrate during the application of the water-based paint. This condensing separator comprises a concentration tank, a filtrate tank, and a filtration apparatus. The concentration tank serves to temporarily hold the booth water in which the generated paint mist has been trapped until it is sent to the filtration apparatus discussed below, and to temporarily hold the concentrate separated by the filtration apparatus. The filtration apparatus filters the booth water in which the generated paint mist has been trapped and separates it into concentrate and filtrate. Any apparatus well known to persons skilled in the art can be used, an example of which is an ultrafiltration apparatus. The above-mentioned filtration tank serves to temporarily hold the filtrate separated by the condensing separator.

In the water-based paint recycling method of the present invention, the above-mentioned concentrate contains the water-based paint, while the above-mentioned filtrate does not.

The water-based paint application booth and the condensing separator are independent, not being connected by piping, in the water-based paint recycling method of the present invention. Accordingly, the water-based paint application booth and the condensing separator do not need to be close together, and can be as far apart as desired as long as the booth water in which the paint mist has been trapped (obtained in the water-based paint application booth) can still be transferred to the condensing separator.

From the standpoints of the operating efficiency of the condensing separator and keeping installation costs low, it is preferable in the water-based paint recycling method of the present invention if a plurality of the water-based paint application booths are set up, and if the condensing separators are set up in a number smaller than the number of water-based paint application booths.

In the water-based paint recycling method of the present invention, it is preferable if, upon completion of the painting, the booth water pooled at the bottom of the water-based paint application booth is transferred to a transport tank, after which the booth water in the transport tank is transferred to the condensing separator. It is also preferable from the standpoint of continuous painting in the water-based paint application booth if the bottom of the water-based paint application booth is filled with fresh water after the booth water has been transferred from the bottom of the water-based paint application booth to the transport tank. Specific examples of fresh booth water include the above-mentioned liquid used to dilute the water-based paint being used, and the filtrate obtained from the condensing separator.

Also, in the water-based paint recycling method of the present invention, from the standpoints of preventing settling and preventing the separation of the paint mist contained in the booth water, it is preferable if the inside of the transport tank is agitated. There are no particular restrictions on the method for achieving this agitation, and any method well known to persons skilled in the art can be used, such as the use of a homomixer. This agitation may be continuous, or may be performed as needed.

Preferred embodiments of the water-based paint recycling method of the present invention will now be described through reference to the figures. FIG. 1 illustrates an example of the water-based paint application booth and condensing separator in the water-based paint recycling method of the present invention. The water-based paint application booth 1 is equipped with a paint tank 2 and an applicator 3, and booth water is pooled at the bottom 4. Part of the booth water pooled at the bottom 4 flows through piping to the booth inner walls 5, forming a water curtain. This water curtain flows back into the booth water pooled at the bottom 4.

First, the object being painted is painted with the water-based paint held in the paint tank 2 by means of the applicator 3. Here, any water-based paint that does not adhere to the object becomes a paint mist, which is trapped by the water curtain composed of part of the above-mentioned booth water flowing down along the inner walls 5, and is admixed in the booth water pooled at the bottom 4. Part of the paint mist falls down by weight and is directly admixed in the booth water at the bottom 4. There are no particular restrictions on the amount of booth water pooled at the bottom of the water-based paint application booth, but from the standpoint of the efficiency of trapping any water-based paint that does not adhere and preventing the fouling of the inner walls of the water-based paint application booth, this amount is preferably large enough to form the above-mentioned water curtain. From the standpoints of working efficiency and paint mist recovery efficiency, it is preferable for the booth water containing the paint mist to be further used as booth water, and for the trapping of the paint mist to be carried out continuously. This is preferable in that the concentration of the paint mist contained in the booth water pooled at the bottom 4 can be further raised. From the standpoint of preventing fouling inside the water-based paint application booth 1 and the concentration and separation performance of the condensing separator 11, it is preferable for the amount in which the paint mist is contained in the booth water pooled at the bottom 4 to be 10 to 15 wt %. This allows booth water containing paint mist to be obtained at the bottom 4 of the water-based paint application booth 1.

With the water-based paint recycling method of the present invention, the water-based paint application booth 1 and the condensing separator 11 are independent, not being connected by piping.

In the water-based paint recycling method of the present invention, the booth water containing paint mist obtained at the bottom 4 of the water-based paint application booth 1 is transferred to the condensing separator 11 upon completion of the painting. The booth water transferred to the condensing separator 11 here may consist of all or part of the booth water pooled at the bottom 4 of the water-based [paint application] booth 1.

There are no particular restrictions on the method of transferring the booth water containing the paint mist obtained in the water-based paint application booth 1 to the condensing separator 11 (indicated by the solid line arrow in the figure), but an example is to scoop the booth water into a separate vessel, and then transfer it from that vessel. In particular, when the water-based paint application booth 1 and the condensing separator 11 are not close together, it is preferable to employ a method in which the above-mentioned separate vessel is a transport tank 4', the booth water pooled at the bottom 4 of the water-based paint application booth 1 is transferred to the transport tank 4', and then the booth water in the transport tank 4' is transferred to the condensing separator 11 (indicated by the dotted line in the figure). There are no particular restrictions on the transport tank 4', but it may have wheels on its bottom, for example, to facilitate transport.

The above-mentioned bottom 4 of the water-based paint application booth 1 may also be a tank in the form of a detachable unit. This allows the bottom 4 to be removed and the booth water containing the paint mist to be directly transferred into the condensing separator 11.

The condensing separator 11 comprises a concentration tank 6, a filtrate apparatus 7, a recovered paint tank 8, a filtration tank 9, and a switching valve 10. The booth water containing the paint mist is treated by the condensing separator 11 and separated into a concentrate, which is a liquid that contains water-based paint, and a filtrate, which is a liquid that does not contain water-based paint.

The booth water thus obtained is then sent to the concentration tank 6. Once sent to the concentration tank 6, the booth water is further filtered by the filtrate apparatus 7 and separated into concentrate and filtrate. The concentrate thus obtained is sent back to the concentration tank 6, and the resulting filtrate is recovered in the filtration tank 9. If the solids weight and/or viscosity of the obtained concentrate here is below a specific numerical value, then the solids weight and/or viscosity of the obtained concentrate can be raised to the specified value by again filtering and separating the liquid into concentrate and filtrate with the filtration apparatus, and thereby further repeating the concentration and separation. The above-mentioned specific numerical value can, for example, be such that the solids weight of the concentrate is the same as the solids weight of the water-based paint held in the paint tank. As for the concentrate, it is preferable for it to be concentrated at least to the viscosity and/or solids weight of the water-based paint held in the paint tank 2. The condensing separator 11 is equipped with the recovered paint tank 8, and the concentrate that has been sent to the concentration tank 6 and adjusted to the specified solids weight and/or viscosity is held in this recovered paint tank 8 through operation of the switching valve 10. There are no particular restrictions on the recovered paint tank 8, but a drum or another such container ordinarily used for transporting paint can be used.

The obtained concentrate contains water-based paint, while the obtained filtrate does not. The obtained concentrate is scooped from the recovered paint tank 8, mixed with the water-based paint held in the paint tank 2, and used for painting. Here, there is no need for scooping if the recovered paint tank 8 is the vessel used for the transport of the paint, since the entire vessel can be transported and the concentrate mixed into the paint tank 2. The obtained filtrate is scooped from the filtration tank 9, held in the bottom 4 of the water-based paint application booth 1, and used as booth water. It is preferable here if the filtrate is held in the bottom 4 after it is scooped into a separate vessel. There are no particular restrictions on the above-mentioned separate vessel, but it is preferably the transport tank 4' used previously in the transport of the booth water containing paint mist. This allows the booth water and paint mist produced in the application of the water-based paint to be reused.

In the mixing of the concentrate that has been concentrated at least to the viscosity and/or solids weight of the water-based paint into the water-based paint held in the paint tank 2, the concentrate can be diluted and the viscosity and/or solids weight thereof adjusted to the specified value. Specifically, this dilution can be accomplished using the above-mentioned dilution of the water-based paint, or the above-mentioned filtrate can be used.

It is preferable if an agitator (not shown) is further provided inside the above-mentioned transport tank.

Figure 2:
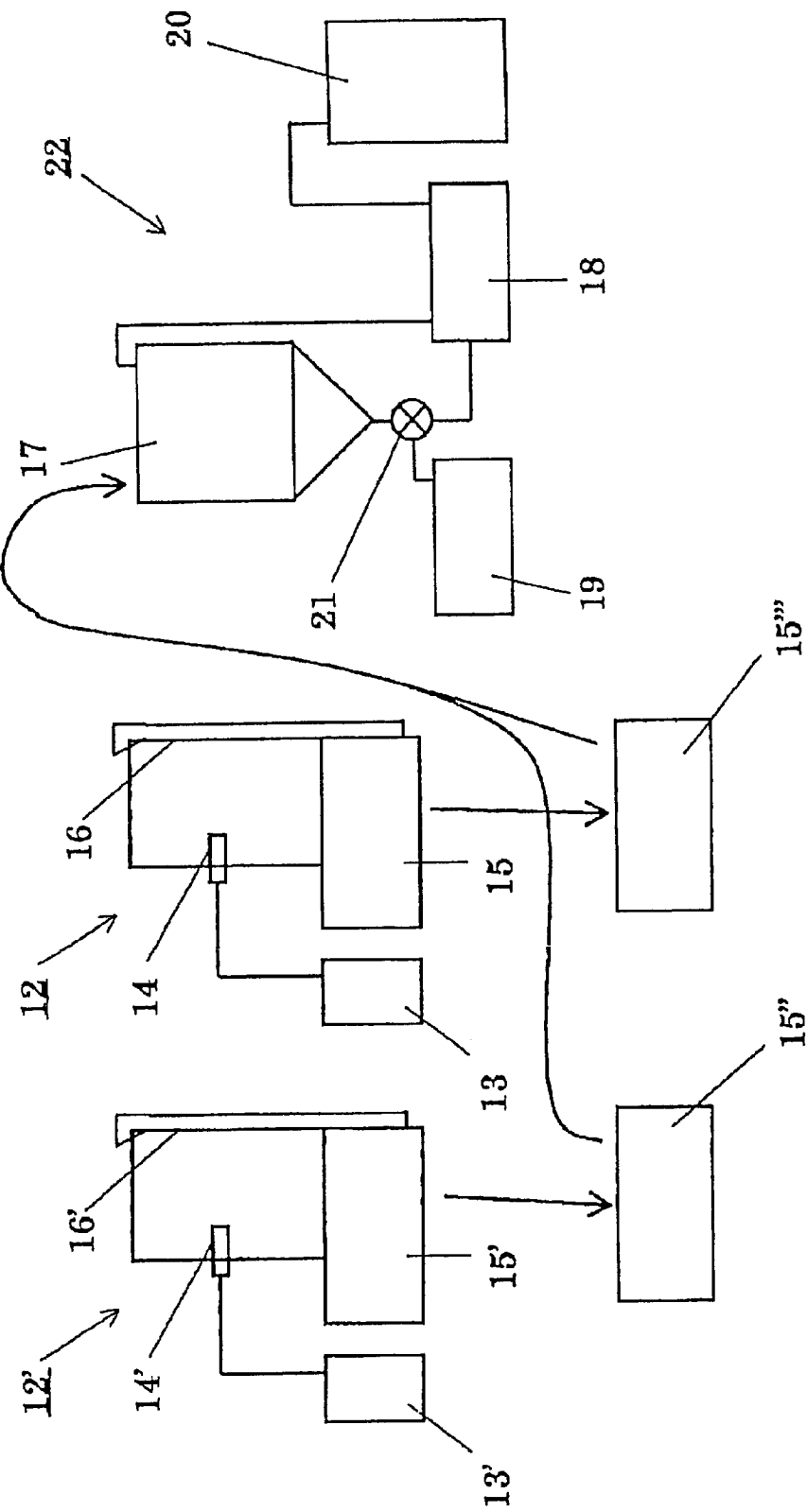
FIG. 2 is a diagram of another example of the water-based paint recycling method of the present invention.

FIG. 2 illustrates an example of the water-based paint recycling method of the present invention when treating booth water containing trapped paint mist and obtained from a plurality of water-based paint application booths.

First, just as described for FIG. 1, the object to be painted is painted with the water-based paint held in paint tanks 13 and 13' using applicators 14 and 14' provided to water-based paint application booths 12 and 12', respectively, having inner walls 16 and 16', respectively, and booth water containing paint mist is obtained in the bottoms 15 and 15' of these water-based paint application booths 12 and 12', respectively.

Next, the booth water containing trapped paint mist and obtained in the respective bottoms 15 and 15' is transferred to respective transport tanks 15''' and 15'' and is combined and sent to a concentration tank 17 of condensing separator 22 and separated into a concentrate and a filtrate by a filtration apparatus 18, just as described for FIG. 1. The filtrate thus obtained in collected in a filtrate tank 20, while the concentrate thus obtained is held in a recovered paint tank 19 through operation of a switching valve 21.

The obtained concentrate contains water-based paint, while the obtained filtrate does not. Furthermore, the obtained concentrate is mixed with the water-based paint held in the paint tank 2 and used in painting, while the obtained filtrate is held at the bottom 4 of the water-based paint application booth 1 and used as booth water. This allows the booth water and paint mist produced in the application of the water-based paint to be reused.

EXAMPLES

EXAMPLE 1

Painting was performed by the following procedure using the water-based paint application booth 1 and condensing separator 11 in FIG. 1, using a water-based acrylic-modified epoxy resin paint (O-De Recycle F-1000, made by Nippon Paint) as the water-based paint, and using a mixture of ion exchange water and diethylene glycol monobutyl ether (weight ratio of ion exchange water/diethylene glycol monobutyl ether=95/5) as a diluent.

Approximately 400 kg of dilution was put in the bottom 4 (600 L volume) of the water-based paint application booth 1 and used as booth water. Approximately 200 kg of water-based paint whose solids weight had been adjusted to 50 wt % with the diluent was put in the paint tank 2 (300 L volume), a steel sheet measuring 300×500 mm was painted in a dry film thickness of 25 $\mu$m using an air sprayer (made by Asahi Sunac) as the applicator 3, and booth water containing paint mist was obtained at the bottom 4 of the water-based paint application booth 1. The painted steel sheet was baked for 20 minutes in a hot air drying oven set to 80° C. to dry the coating and obtain a painted steel sheet.

Approximately 400 kg of booth water containing paint mist from the bottom 4 of the water-based paint application booth 1 was scooped into the concentration tank 6 (600 L volume) of the condensing separator 11, which was not connected to the water-based paint application booth 1 by piping and was approximately 10 meters distant, and [this booth water] was sent to the filtrate apparatus 7 by the switching valve 10. A single EW4026 (an ultrafiltration apparatus made by Desalination Systems, permeability 4 m3/day) was used as the filtrate apparatus 7. The specified solids weight of the concentrate recovered in the recovered paint tank 8 was set at 50 wt %.

The obtained concentrate was sent back to the concentration tank 6, and the filtrate was recovered in the filtration tank 9. This filtration and recirculation process was repeated until a concentrate with a solids weight of 50 wt % was obtained. The switching valve 10 was operated and [the concentrate] was held in the recovered paint tank 8. This allowed the filtration to be carried out without the booth water overflowing from the concentration tank.

The obtained concentrate was mixed into the paint tank 2 as water-based paint. The obtained filtrate was held in the bottom 4 of the water-based paint application booth 1 as fresh booth water.

The water-based paint in the paint tank 2 was again applied in the same manner to obtain a painted steel sheet. The resulting painted steel sheets were indistinguishable in appearance.

EXAMPLE 2

An object was painted with a water-based paint in the same manner as in Example 1 to obtain a painted steel sheet and booth water containing paint mist at the bottom 4 of the water-based paint application booth 1.

The booth water containing paint mist pooled at the bottom 4 of the water-based paint application booth 1 was then transferred to the transport tank 4', after which the booth water in the transport tank 4' was put into the concentration tank 6, but everything else was carried out as in Example 1 to obtain a concentrate with a solids weight of 50 wt %. The obtained filtrate was recovered in the filtration tank 9, and the switching valve 10 was operated to hold the concentrate in the recovered paint tank 8. This allowed the filtration to be carried out without the booth water overflowing from the concentration tank, and without any sediment building up in the transport tank.

The obtained concentrate was mixed into the paint tank 2 as water-based paint. The obtained filtrate was held in the bottom 4 of the water-based paint application booth 1 as fresh booth water.

The water-based paint was used to paint the object in the same manner as in Example 1 to obtain a painted steel sheet. The resulting painted steel sheets were indistinguishable in appearance.

EXAMPLE 3

Using a condensing separator 22 equipped with the water-based paint application booths 12 and 12' in FIG. 2 having the same volume as in Example 1, and a concentration tank 17 with a volume of approximately 1200 L, water-based paint and booth water were put in and painting was performed in the same manner as in Example 2 to obtain a painted steel sheet and booth water containing paint mist.

First, as in Example 2, the obtained booth water containing paint mist was put into the concentration tank 17 to obtain a filtrate and concentrate with a solids weight of 50 wt %. This allowed the filtration to be carried out without the booth water overflowing from the concentration tank, and without any sediment building up in the transport tank.

The booth water containing paint mist was put into the concentration tank 17, after which the bottoms 15 and 15' of the water-based paint application booths 12 and 12' were filled with fresh booth water and the water-based paint was replenished in the paint tanks 13 and 13', after which painting was performed in the same manner as in Example 2 to obtain a painted steel sheet and booth water containing paint mist.

Next, as in Example 2, the obtained booth water containing paint mist was put into the concentration tank 17, after which the bottoms 15 and 15' of the water-based paint application booths 12 and 12' were filled with the filtrate obtained in the previous operation, and the obtained concentrate was held in the paint tanks 13 and 13', after which the object was painted with water-based paint in the same manner as in Example 2 to obtain a painted steel sheet and booth water containing paint mist.

The resulting painted steel sheets were indistinguishable in appearance.

The water-based paint recycling method of the present invention is characterized in that the water-based paint application booth and the condensing separator are independent, not being connected by piping, thereby affording greater freedom in layout, with no space restrictions on where the condensing separator is installed. In particular, when a new condensing separator is installed for an existing water-based paint application booth, or when a new water-based paint application booth and a new condensing separator are installed, there is no need for the water-based paint application booth and the condensing separator to be close together, so vacant space can be utilized more effectively.

Also, if a plurality of water-based paint application booths are set up, the condensing separators can be set up in a number smaller than the number of water-based paint application booths, so there is no need for the number of water-based paint application booths to be the same as the number of condensing separators, and this further reduces installation costs. Also, since a condensing separator treats booth water obtained from a plurality of water-based paint application booths, the condensing separator can be used more efficiently.

Furthermore, if, upon completion of the painting, the booth water pooled at the bottom of the water-based paint application booth is transferred to a transport tank, after which the booth water in the transport tank is transferred to the condensing separator, then the booth water in the transport tank can be easily moved to the condensing separator even when the water-based paint application booth is far away from the condensing separator. Finally, because no piping is used, equipment maintenance is lower.

What is claimed is:

1. A water-based paint recycling method which comprises pooling booth water from paint overspray in the bottom of a water-based paint application booth, trapping paint mist that is generated from paint application by the booth water, treating the booth water containing the trapped paint mist with a condensing separator to form condensate and filtrate, and reusing the filtrate, wherein the water-based paint application booth and the condensing separator are independent, not being connected by piping.

2. The water-based paint recycling method according to claim 1, wherein a plurality of water-based paint application booths are set up, and the condensing separators are set up in a number smaller than the number of water-based paint application booths.

3. The water-based paint recycling method according to claim 1, wherein, upon completion of the painting, the booth water pooled at the bottom of the water-based paint application booth is transferred to a transport tank, after which the booth water in the transport tank is transferred to the condensing separator.

4. The water-based paint recycling method according to claim 3, wherein the bottom of the water-based paint application booth is filled with fresh water after the booth water has been transferred from the bottom of the water-based paint application booth to the transport tank.

5. The water-based paint recycling method according to claim 3, wherein the inside of the transport tank is agitated.

6. The water-based paint recycling method according to claim 2, wherein upon completion of the painting, the booth water pooled at the bottom of the water-based paint application booth is transferred to a transport tank, after which the booth water in the transport tank is transferred to the condensing separator.

7. The water-based paint recycling method according to claim 6, wherein the bottom of the water-based paint application booth is filled with fresh water after the booth water has been transferred from the bottom of the water-based paint application booth to the transport tank.

8. The water-based paint recycling method according to claim 6, wherein the inside of the transport tank is agitated.

9. The water-based paint recycling method according to claim 7, wherein the inside of the transport tank is agitated.

* * * * *